W. A. TURBAYNE.
AUTOMATIC ELECTRIC REGULATOR.
APPLICATION FILED JUNE 29, 1914. RENEWED SEPT. 25, 1919.

1,325,597.

Patented Dec. 23, 1919.
2 SHEETS—SHEET 1.

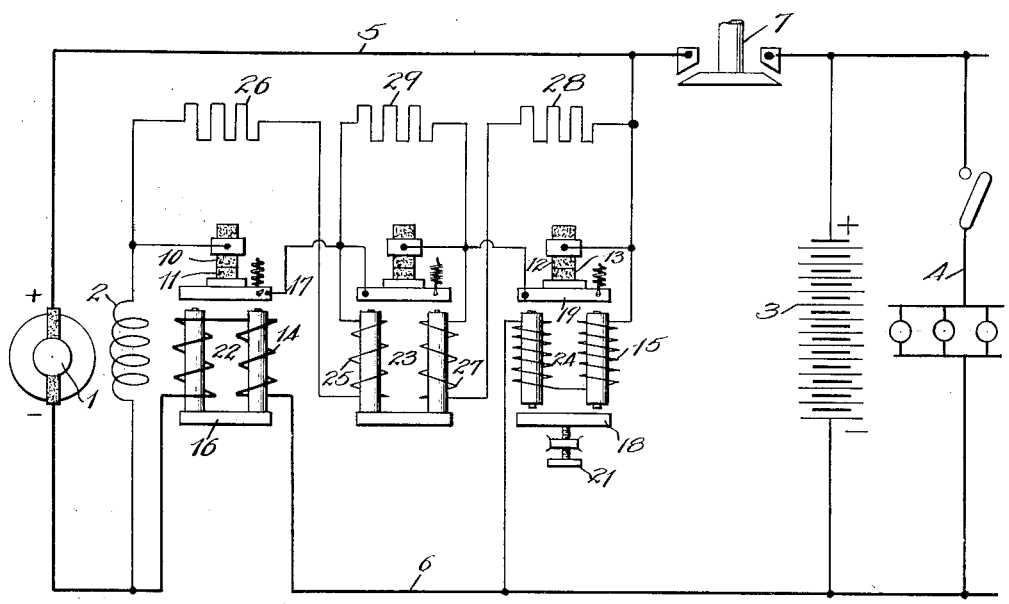

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

AUTOMATIC ELECTRIC REGULATOR.

1,325,597. Specification of Letters Patent. Patented Dec. 23, 1919.

Application filed June 29, 1914, Serial No. 847,941. Renewed September 25, 1919. Serial No. 326,382.

*To all whom it may concern:*

Be it known that I, WILLIAM A. TURBAYNE, a citizen of the United States, residing at Niagara Falls, in the county of Niagara and State of New York, have invented new and useful Improvements in Automatic Electric Regulators, of which the following is a full, clear, concise, and exact description, reference being had to the accompanying drawing, forming a part of this specification.

This invention relates to improvements in automatic electric regulators.

Regulators for variable speed shunt-wound generators, such as are used in car-lighting systems, have been devised heretofore in which a fixed resistance is arranged to be connected in the generator field circuit, the effective value of said resistance being varied by a vibrating relay which rapidly opens and closes a shunt circuit around said resistance. The relay is provided with a series coil in the main circuit between the generator and the customary storage battery with which it is connected and it is provided also with a shunt coil connected across the generator terminals. The generator is normally regulated for constant current by the series coil, but when the voltage reaches the maximum value at which it is desired to charge the battery, the shunt coil is rendered effective to regulate for substantially constant voltage, thus giving a tapering charge to the battery.

An object of this invention is to provide a regulator of the vibrating relay type which may be more accurately adjusted to maintain predetermined current and voltage regulation than previous regulators of this type.

Another object of the invention is to provide a vibrating regulator in which the voltage regulator will remain inactive until a predetermined voltage on the system is reached and which will thereafter regulate to maintain a constant voltage on the system which is lower than said predetermined voltage.

A further object is to provide a system of regulation wherein the advantages of subdividing the resistance units into a plurality of sections, both for current and voltage regulation, may be obtained by the use of a less number of vibrating relays than would ordinarily have to be employed.

These and other objects are attainable by the embodiments of the invention illustrated in the accompanying drawings, in which—

Fig. 2 represents diagrammatically a modified system, and

Figs. 3 and 4 represent diagrammatically two forms of relay in side elevation.

Figure 1:
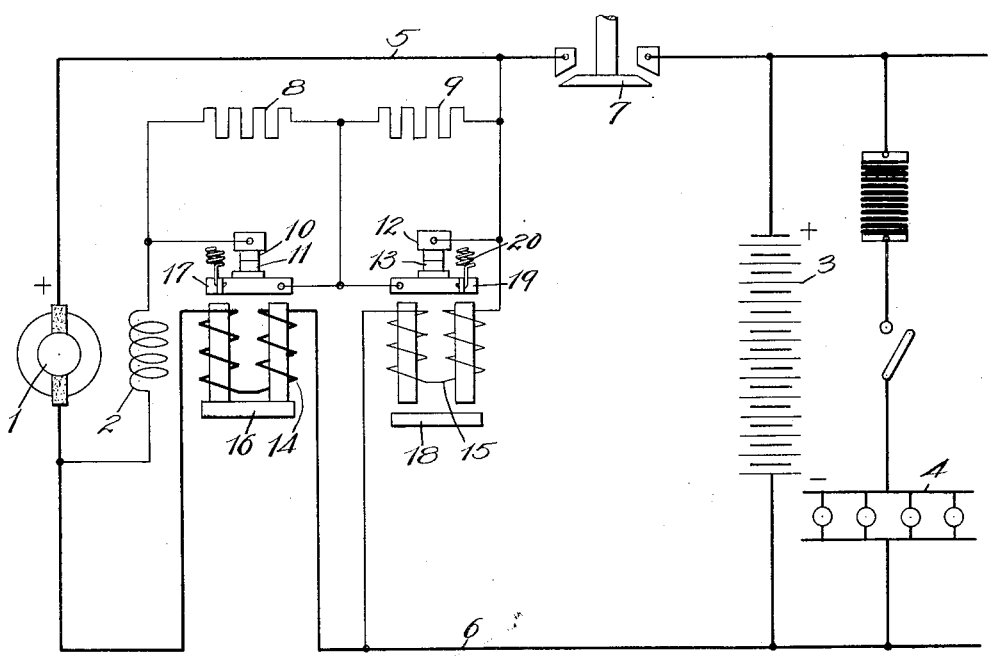
Figure 1 represents diagramatically one embodiment of the invention.

Fig. 1 illustrates a variable speed generator having an armature 1 and a shunt field winding 2. A storage battery 3 and lamps or other translating devices 4, are connected in parallel branches across the generator leads 5 and 6. An automatic switch 7, of any preferred type, is connected in the positive generator lead 5 and operates to connect the generator to the system when the generator voltage substantially equals the battery voltage and to disconnect the generator when its voltage falls below that of the battery.

The generator is regulated by means of sections of resistance 8 and 9 in series with the generator field winding. These resistances are normally short-circuited by the relay contacts 10, 11, and 12, 13, respectively, which are adapted to be operated by relay coils so as to rapidly make and break the short circuits around the resistance sections and thereby to control the effective value of the respective resistances. Contacts 10 and 11, short circuiting resistance 8, are controlled by a relay coil 14 connected in series in one generator lead, and contacts 12 and 13, short-circuiting resistance 9, are controlled by relay coil 15, connected across the generator leads.

Relay coil 14 is wound on the parallel legs of a horseshoe magnet having a yoke 16 at one end, magnetically connected with the legs of the magnet, and a pivoted armature at the other end which carries and causes the vibration of contact 11 of the pair of contacts 10, 11.

The relay coil 15 is similarly wound on a similar horse-shoe magnet which, however, has a pivoted yoke 18 at one end and a pivoted armature 19 at the other, the latter of which carries and causes vibration of contact 13 of the pair of contacts 12, 13.

Adjustable springs 20 normally hold the armatures 17 and 19 away from their respective magnets and in position to short-circuit the resistance sections, and the pivoted yoke 18 is normally held by gravity or otherwise, in retracted position against an adjustable stop 21 so that a predetermined air gap may be maintained between the yoke and the legs of the magnet.

When the generator is at rest or operating at a low speed, the automatic switch will be open and resistances 8 and 9 will be short-circuited as illustrated in the drawing. The resistance of the field circuit of the generator is therefore a minimum and the generator voltage will rapidly build up as the armature begins to rotate. At a predetermined voltage the automatic switch will close and the generator will supply current to charge the battery and supply the lamps. The adjustment is such that at a predetermined current representing the maximum current which it is desired to have the generator deliver, coil 14 will be sufficiently energized to attract its armature 17 and, by opening the short circuit around resistance 8, insert this resistance in series with the field winding. The resultant drop in generator voltage immediately causes the winding to release its armature, whereupon the spring 20 causes an immediate closure of the short circuit. These operations are repeated in rapid succession, so that the contact 11 vibrates very rapidly, the character of vibration determining the effective value of the resistance.

When a voltage is reached which is the maximum voltage desired to be impressed upon the battery, the winding 15 of the voltage regulator becomes sufficiently energized to attract the lower iron yoke 18, and by thus decidedly reducing the air gap, the effective flux in the magnetic circuit reaches such a value as to cause the attraction of the armature 19. The latter then vibrates continuously and so regulates the generator field strength through the resistance 9 as to hold the generator voltage at a floating battery value. The moment the relay 15 acts and causes the battery to float, the voltage of the generator is so reduced as to cause the relay 14 to be deënergized and thereafter the resistance 8 is short-circuited. The generator is thereafter regulated to maintain constant potential.

One of the important features in the operation of the regulator is that the relay 15 remains unresponsive until a certain predetermined voltage is developed. The moment the lower yoke is attracted, however, the great reduction in the air gap thereby brought about, causes the upper or vibrating armature to respond to a much lower voltage than that required to cause the attraction of the lower armature or yoke.

The advantages of employing the improved relay and regulator in connection with car-lighting systems may be illustrated by considering a representative set of conditions obtaining in such a system. Assuming a 30 volt system employing 16 lead battery cells, a fully charged condition of the battery may be indicated when the voltage of the system has risen to approximately 42 volts, but the voltage at which the battery will just float across the line is approximately 35 volts. With the improved construction of regulator, therefore, it is possible to set the pivoted yoke on the voltage regulator to respond at 42 volts which, as already explained, would be insufficient to operate the pivoted armature as long as the lower air gap is open. As soon as the lower armature is raised and the lower air gap eliminated, the reluctance of the magnetic circuit will be so reduced that the pivoted armature will be within the radius of influence and may be set to vibrate to hold substantially 35 volts on the system. Thus, with this device it is possible to employ a single normally energized voltage coil which will prevent operation of the voltage regulator until the predetermined voltage of the battery is reached, after which point the regulator will automatically operate to hold the proper voltage on the system to float the battery across the line.

The above described regulator comprises a single current responsive relay and a single voltage responsive relay with their corresponding sections of resistances. This arrangement suffices for machines of small output, having a comparatively low field current, or machines operating over only a small range of speed variations. Under other conditions, and in order to minimize sparking at the electrodes, it is desirable, particularly on larger machines, to subdivide the resistance units, thus necessitating an increase in the number of regulating devices. In fact, it would be desirable to have at least two vibrating regulators operating over two sections of resistance, both for the current regulator and for the voltage regulator. This, however, would require the two lower armatures of the voltage regulator to be mechanically connected so that they would both lift to close the air gaps of the voltage magnets at the same instant.

Fig. 2 illustrates a regulating system in which the advantages of subdividing the resistances are obtained without the attendant complications just referred to. In said figure, three regulating devices are shown, two of which are operative at one time to effect current regulation, and two of which are operative at other times to effect voltage regulation. In this figure certain of the reference characters previously employed are used to indicate corresponding parts of the system. Three relays, 22, 23 and 24, are employed, relays 22 and 24 being wound and constructed in the same manner as the current and voltage relays described in Fig. 1. The intermediate relay 23 has upon one leg of its magnet a coil 25 connected in series with a resistance section 26, the latter being the section controlled by the relay 22. The coil 27 upon the other leg thereof has in series therewith the resistance section 28, which latter is the one normally controlled by the relay 24. A third section of resistance 29 is provided for the intermediate relay.

Under conditions of rest the resistance unit 26 and the coil 25 are short circuited by the relay 22, the resistance 28 and the coil 27 are short circuited by the relay 24, and the resistance 29 is short circuited by the relay 23. As soon as the current through the series coil of the relay 22 exceeds the value for which the latter is set to operate, the pivoted armature begins to vibrate, whereupon the coil 25 is energized intermittently at a rapid rate. The intermediate regulator will, therefore, vibrate in synchronism with the current regulator, but its motion will lag slightly behind that of the latter, so that the two resistance sections 26, 29, will be successively introduced into the field circuit and the tendency to spark at the contacting electrodes will, therefore, be minimized. The resistance section 26 is of comparatively small value, while that of section 29 is of sufficient value to bring about the necessary weakening of the field to satisfy maximum speed conditions.

When the maximum desired battery voltage is reached the voltage relay 24 responds in the manner previously described, the vibrations of the upper pivoted armature serving to introduce the resistance 28 and the coil 27 into the circuit for successive short intervals of time and the relay 22 becoming inert, due to the reduction in generator voltage. Accordingly, both resistance sections 28 and 29 are rendered effective for regulating purposes.

It will thus be seen that the armature of the intermediate regulator vibrates synchronously with either the current regulator or the voltage regulator, and hence with three regulating relays the same regulating action is obtained as would be possible with four regulating devices and four resistance units. With the improved arrangement shown in this figure, both the current and the voltage may be held to a closer constant value for the reason that if two current regulators and two voltage regulators were employed, one each of the current and voltage regulators would have to be made to respond to slightly higher current and voltage values respectively than the other corresponding devices.

Although in both circuit diagrams, the coils of the series relay are shown as being connected in the main circuit between the generator and storage battery, to regulate for constant total current, they may be otherwise connected in a well known manner to regulate for constant current in the battery branch, if desired.

The embodiments of the invention herein disclosed are merely for the purpose of illustration, as obviously many changes may be made in the details of construction and arrangement of parts without departing from the scope of the invention as defined in the appended claims.

Having thus described my invention, what I claim as new and desire to secure by Letters Patent of the United States is:

1. Means for regulating a generator comprising a plurality of resistance sections arranged in series with a generator field winding, a plurality of relays, each having a vibrating armature to control a short circuit around a resistance section, one of said relays having a second pivoted armature normally maintaining an air-gap sufficient to render the other armature thereof inoperative.

2. Means for regulating a generator comprising a plurality of resistance sections arranged in series with a generator field winding, a plurality of relays, each having a vibrating armature to control a short circuit around a resistance section, one of said relays having a second pivoted armature normally maintaining an air gap sufficient to render the other armature thereof inoperative, said latter relay being connected across the generator terminals and the other relay being connected in series with the armature thereof.

3. In a regulating system, a variable speed generator, a storage battery supplied thereby, a plurality of resistance sections in series with the generator field, a current relay in the circuit between the generator and the battery, a voltage relay connected across said circuit, each of said relays having an armature mounted to vibrate freely, each of said armatures controlling a short circuit around a section of resistance, said voltage relay having a pivoted yoke which normally maintains a sufficient air gap to render its corresponding armature inoperative whereby the latter becomes operative only upon predetermined voltage increase of the generator sufficient to cause the attraction of said yoke.

4. An electric regulator comprising a plurality of resistance sections adapted to be connected in series with a generator field winding, a current responsive relay for controlling a short circuit around one of said resistance sections, a voltage responsive relay for controlling a short circuit around another of said resistance sections, and a third relay for controlling a short circuit around a third resistance section, the operation of said third relay being dependent upon the operation of said current or voltage responsive relays.

5. In a regulating system, a generator comprising an armature and a shunt field winding, a storage battery, conductors connecting said generator and battery, an automatic switch for controlling the circuit to said battery, a regulating resistance in series with said field winding, said resistance being divided into three sections, a current responsive relay in the main circuit, a voltage responsive relay connected across said circuit and an intermediate relay, a pivoted armature for each of said relays, each armature being adapted to vibrate to regulate the mean value of the corresponding resistance sections by opening and closing a short circuit around the same, said intermediate relay having two coils thereon, one of which is arranged to be short circuited when the series controlled resistance section is short circuited and the other of which is arranged to be short circuited when the voltage controlled resistance section is short circuited whereby the generator current is regulated normally by the action of the series relay which controls its own resistance and also that of the intermediate relay, and whereby after the attainment of a predetermined voltage of the battery, the generator is regulated by the voltage relay which controls its own resistance section and that also of said intermediate relay.

6. A regulator, comprising a plurality of resistance sections in series, a series relay, a shunt relay, and an intermediate relay therefor, and means permitting said shunt relay to operate at a lower voltage than that at which it responds initially.

7. An electric regulator for a shunt wound generator, comprising two resistance sections arranged to be connected in series with the generator field winding, two sets of contacts, each adapted to control a shunt circuit around one of said resistance sections and two relays each arranged to cause one set of said contacts to make and break the corresponding shunt circuit at a rapid rate, one relay and its corresponding resistance section being arranged to regulate said generator for constant current and the other relay being provided with means to render same inoperative up to a certain voltage and operative thereafter at a lower voltage, said other relay and its corresponding resistance section being arranged to regulate said generator for constant voltage.

8. Generator regulating means including a plurality of resistances adapted to be connected in series in a circuit to regulate said generator, vibratory contacts for short-circuiting said resistance, and means for causing rapid vibrations of said contacts under predetermined conditions, said means including an electro-magnetic winding connected in series with the main circuit from said generator for controlling the short-circuiting contacts for one of said resistances and an electro-magnetic winding connected in shunt to said generator for controlling the short-circuiting contacts for the other resistance, said shunt winding being provided with a flux path of variable reluctance whereby said shunt winding is ineffective up to a certain voltage and is thereafter effective to hold a lower voltage constant.

9. In combination, a generator having a shunt field winding, a first resistance in series with said winding, electro-magnetic means for controlling the operative circuit of said first resistance, a second resistance in series with said winding, electro-magnetic means in series with said first resistance for controlling the operative circuit of said second resistance, a third resistance in series with said winding, electro-magnetic means for controlling the operative circuit of said third resistance, and other electro-magnetic means in series with said third resistance for controlling said second resistance.

10. In combination, a variable speed generator, a plurality of resistances in series with the field circuit of said generator, vibratory relays for throwing said resistances into and out of operative circuit, one of said relays having a plurality of windings, each connected in series with one of said resistances.

In witness whereof I have hereunto subscribed my name in the presence of two witnesses.

WILLIAM A. TURBAYNE.

Witnesses:
JOHN D. BLACK,
JOSEPH BOHN.